Patented Sept. 19, 1939

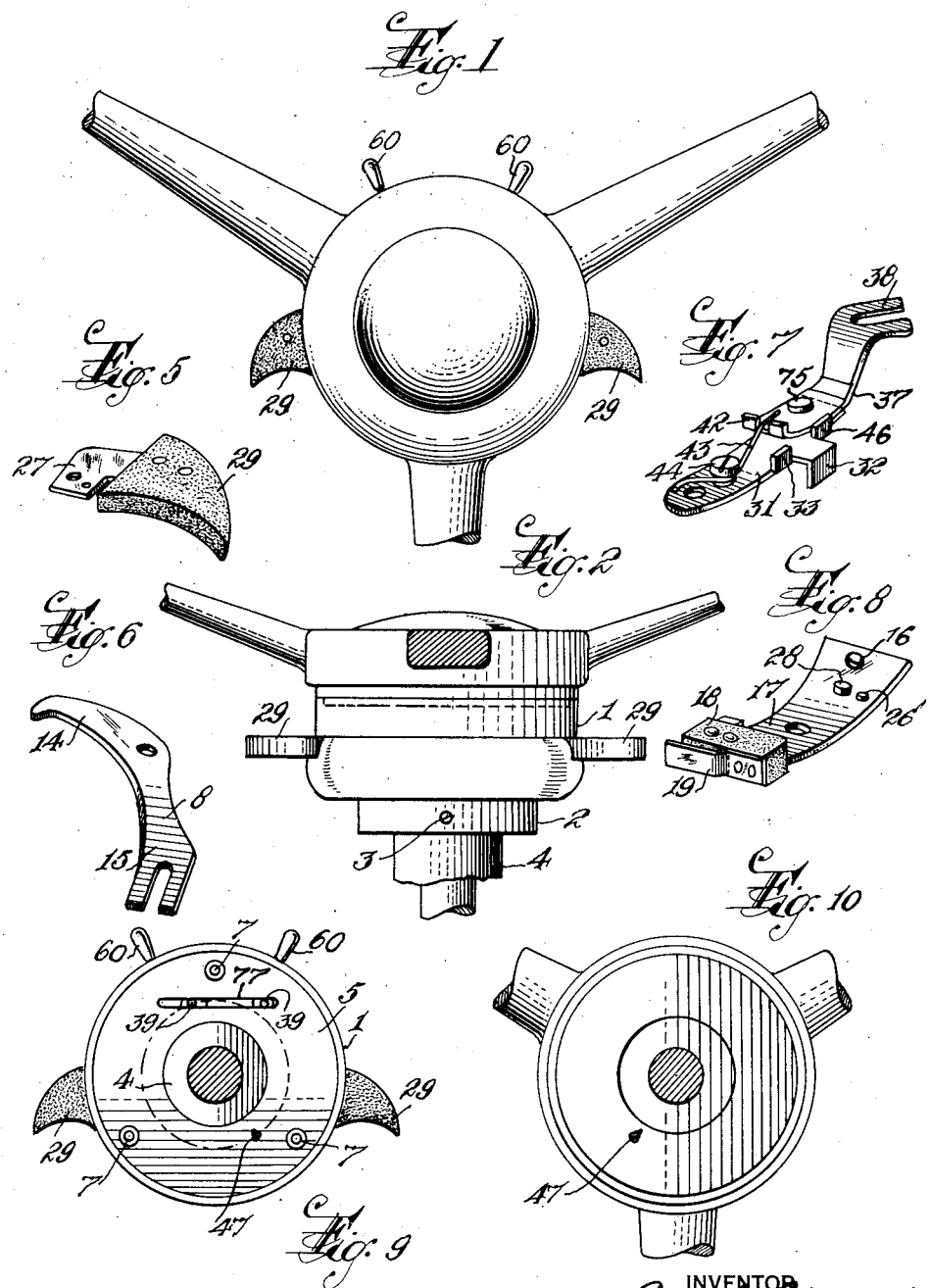

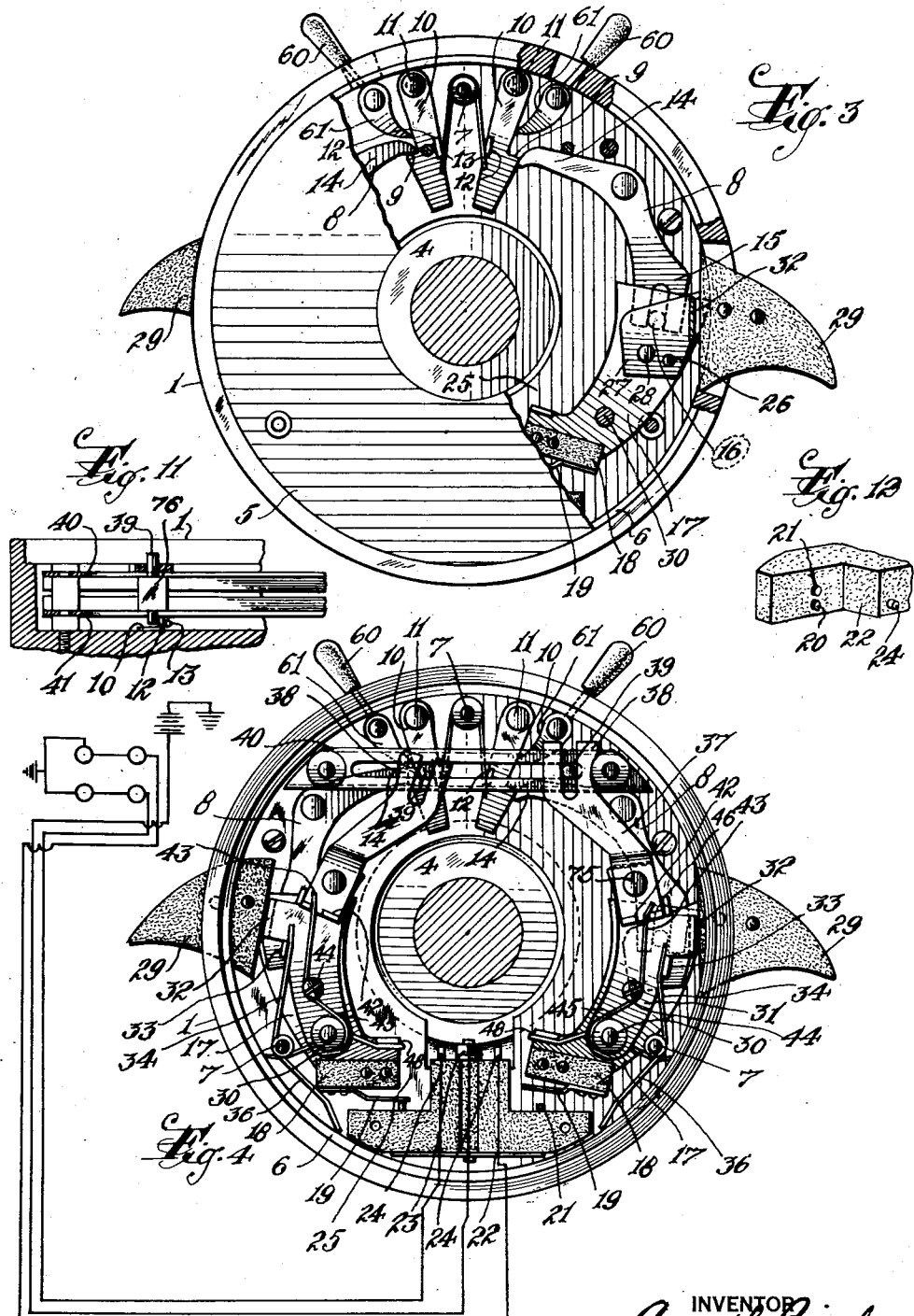

2,173,513

UNITED STATES PATENT OFFICE 2,173,513

DIRECTION INDICATING DEVICE FOR MOTOR VEHICLES

Carl F. Bierbach, Newark, N. J., assignor to A. D. S. Corp., Newark, N. J., a corporation of New Jersey Application January 14, 1939, Serial No. 250,874

6 Claims. (Cl. 200—59)

This invention relates to signalling devices for motor vehicles and more particularly to improvements for indicating the direction in which the motor vehicle is to be turned.

With closed automobiles and large trucks, it is often difficult and inconvenient for the driver to indicate to drivers of following and approaching vehicles, the direction in which the vehicle is to be turned. This is especially true in the winter time when it is necessary to keep the windows closed. Also, trucks are now built of such a size that it is impractical for the driver to extend his hand beyond the side walls of the truck to indicate a turn.

It is, therefore, an object of this invention to provide a device positioned on the steering post adjacent the steering wheel within easy reach of the hands of the driver of the motor vehicle, for indicating the direction in which the vehicle is to be turned. The device is preferably mounted on the steering post beneath the steering wheel, and provided with finger pieces which can be readily and conveniently manipulated by the fingers of the driver without necessitating the removal of the hand from the steering wheel.

A further object is the provision of a direction indicating device for motor vehicles, which device is simple in structure and positive in operation, and will not readily get out of order no matter how frequently it may be used.

A further object is the provision in a direction indicating device for motor vehicles, of means for automatically returning the parts of the device to a neutral position after the motor vehicle has made the desired turn indicated by the device, and again straightened out.

A further object of the invention is the provision of an indicating device for motor vehicles, having means which enable the continuance of the signal as long as the vehicle is being turned in the same direction; and means to automatically return the parts to a neutral position and discontinue the signal after the preceding vehicle has been passed.

A further object is the provision of an indicating device which can be readily and conveniently installed on any type of motor vehicle without material alteration.

These and other advantageous objects, which will later appear, are accomplished by the simple and practical construction and arrangement of parts hereinafter described and exhibited in the accompanying drawings, forming part hereof, and in which:

Fig. 1 is a plan view of a portion of a steering wheel associated with a device embodying the invention, Fig. 2 is an elevational view of the device shown in Fig. 1, Fig. 3 is a plan view of the control device with the steering wheel removed and part of the cover broken away, Fig. 4 is a plan view of the control device with the cover removed, Figs. 5, 6, 7, 8 are perspective views of elements of the device, Fig. 9 is a plan view of the control device, Fig. 10 is a bottom view of a steering wheel used in connection with the device, Fig. 11 is a sectional view taken on line 11—11 of Fig. 4, and Fig. 12 is a perspective view showing a portion of an insulating block, carrying contact members, used in the device.

Referring to the drawings, the indicating device is shown to comprise a casing 1, having a collar portion 2, on the underside thereof, which is attached by means of set screws 3 to a steering column 4 of an automobile. The casing is provided with a cover plate 5 which rests upon shoulder 6 and has apertures which fit over pins 7, projecting upwardly from the bottom of the casing, and provided with a slot 77.

Referring to Figs. 3 and 4, pivotally mounted on plate 25, in the casing, on each side thereof, are levers 8. The structure on each side of the casing being the same, only one side will be described.

The lever 8 has one end thereof adapted to engage a shoulder 9 of a lever 10, pivoted at 11 to the casing, the lever 10 having an upstanding boss 12 which engages a sprinb 13, the spring tending normally to force the lever 10 towards the end 14 of lever 8.

The other end 15 of lever 8 is forked and embraces a pin 16 of a lever 17 also pivotally mounted on the casing. The opposite end of the lever 17 is provided with a block 18 of insulating material carrying thereon a metallic spring brush contact member 19 adapted to engage contacts 20 and 21 supported by a block 22 of insulating material, the contact 20 being connected through the block 22 to a terminal 23 which is connected to the positive pole of the storage battery of the automobile, and the contact 21 is connected to a lead 24 which is connected to an indicating lamp (not shown) on the right side of the automobile.

Wires connected to terminals 23 and 24 pass beneath the plate 25 and out through the casing to the battery and to indicating lamps, the latter of course being grounded. Connected to lever 17 by means of a screw 26 is a plate 27 which has an aperture through which projects also a pin 28 on the upper side of lever 17. Attached to plate 27 is a manipulating handle 29 which projects outside of the casing. Projecting upwardly from the plate 25 is a pin 30 upon which the lever 17 is pivoted. Separated from the lever 17 by suitable spacers is an upper lever 31 having a downturned flange 32 adapted to engage the handle 29 as the latter is moved inwardly into the casing. The lever 31 is provided with an upstanding projection 33 which engages one end of a spring 34 which is wound about a pin 7 projecting upwardly from plate 25 the other end of the spring 36 engaging the inner walls of the casing and tending normally to urge lever 31 towards the handle 29. Pivotally connected to one end of lever 31 by a pin 75 is a lever 37 which has the free end thereof forked at 38 and adapted to engage an upstanding pin 39 which is integral with a block 76 slidably mounted in guides 40 and 41. The opposite end of lever 37 has an upstanding flange 42 provided with a notch receiving one end of the spring 43 which is wound about a screw 44 on the lever 31, the other end 45 of the spring being wound about a pin 30.

In operation, when the handle 29 is moved inwardly for the purpose of indicating a right turn, it engages the flange 32 and moves lever 31 inwardly which causes the boss 46 thereon to engage lever 37 and cause the latter to move the pin 39 in the guides 40 and 41 towards the center portion of said guides. At the same time, the forked end of lever 8 is moved inwardly which causes the end 1 thereof to engage the shoulder 9 of lever 10 and hold the members in a latched condition. When the levers are in this condition, as shown for example on the left hand side of Fig. 4, the brush 19 makes contact between the contact member 20 and 21 to cause a signal. As long as the steering wheel is turned to the right the signal will be maintained, as right turning of the wheel will cause the pin 47 on the underside of the steering wheel to engage the pin 39 and slip over the latter as the pin 39 is moved to the right. After the turn has been completed and it is desired to drive in a straight line or turn in an opposite direction the steering wheel is then turned to the left which causes the pin 47 to engage pin 39 and move the latter towards the left. Leftward movement of pin 39 will cause the block upon which it is mounted to engage the shoulder 12 and move the lever 10 to the left to unlatch the device by causing disengagement between shoulder 9 and the end 14 of lever 8, whereupon the parts are automatically returned to their normal position by means of springs 36 and 48.

Should the device be set as shown in Fig. 3 for example, to indicate a turn to the left, the part 14 of lever 8 will engage the shoulder 9 of the lever 10. Should the operator decide not to make this turn, the parts can be returned to their original position by bearing down upon the handle 63 of lever 61 to cause the lever 61 to move the latch lever 10 to the right against the action of spring 13 and disengage the portion 14 from the shoulder 9.

The various parts of the device are mounted upon the plate 25 which can be readily removed from the casing when desired.

The foregoing disclosure is to be regarded as descriptive and illustrative only, and not as restrictive or limitative of the invention, of which, obviously, embodiments may be constructed, including many modifications, without departing from the spirit and scope of the invention herein set forth and denoted in the appended claims.

Having thus described my invention, what I claim as new and desire to secure by Letters Patent, is:

1. In a direction indicating device for motor vehicles, a casing adapted to be mounted upon a steering post, a first lever pivotally mounted in the casing, contact means on said lever for closing an electrical circuit through direction indicating lamps when one end of said lever is moved inwardly in the casing, a pin projecting from said lever, a second lever having a forked end engaging said pin, a third lever pivotally mounted in the casing and having a shoulder adapted to engage one end of the second lever, spring means normally urging said third lever into engagement with the second lever, a plate attached to the first lever and having a handle extending outside of the casing to move the first lever inwardly, a fourth lever pivotally mounted in the casing and positioned above the first lever, said fourth lever having a flange adapted to engage said handle, a fifth lever pivotally mounted in the casing and having one end thereof pivotally connected to the fourth lever, a block having a pin projecting upwardly therefrom, said fifth lever having one end thereof forked and engaging said last mentioned pin, guide means for the block, spring means tending to maintain said fifth lever in a predetermined position, a steering wheel having a pin projecting from the underside thereof and adapted to engage the pin on the block to move the latter freely in the guide when the vehicle is being turned, said pin on the steering wheel engaging the pin on the block to move the latter into engagement with the third lever to disengage the third lever from the second lever when the wheel is moved to a position to straighten out the guide wheels of the vehicles, and spring means to return all of said levers to their normal positions after the wheels have been straightened out.

2. In a direction indicating device for motor vehicles, a casing adapted to be mounted upon a steering post, a first pair of levers pivotally mounted in the casing and pivotally connected to each other, one of said levers having contact means for closing an electrical circuit, spring controlled means for holding the other lever in a predetermined latched condition, a handle projecting out of the casing and connected to said levers for moving said levers into a position to be latched, a second pair of levers positioned above the first pair of levers, a block having a pin projecting upwardly therefrom, guide means for said block, one of said second pair of levers having a forked end engaging said pin, spring means for urging said pin into a predetermined position, a steering wheel having a pin projecting from the underside thereof adapted to engage the pin on the block, said pin on the steering wheel moving the pin on the block freely in the guide during the turning of the wheel in one direction and engaging said pin on the block to move the latter into a position to release the latching means when the wheel is turned in an opposite direction, and spring means to return said levers to a definite position when the wheel has been turned to straighten out the guide wheels of the vehicle.

3. In a direction indicating device for motor vehicles, a casing adapted to be mounted upon a steering post, a first lever having means thereon for closing an electrical circuit, a second lever loosely connected to the first lever, spring controlled latching means for holding said second lever when the latter is moved to a predetermined position, a block having a pin projecting therefrom, a guide for said block, a third lever having a fourth lever pivotally connected thereto and positioned above the first and second levers, said fourth lever having one end forked and engaging the pin, a handle projecting out of the casing and having means to move said levers to cause the second lever to be latched and the fourth lever to move the pin to a predetermined position when the handle is moved into the casing, a steering wheel having a projection on the underside thereof adapted to engage the pin to move the latter freely in the guide when the wheel is to be turned to turn the guide wheels of the vehicle, said projection engaging the pin to move the block to release the latching means when the steering wheel is turned to straighten out the guide wheels, and spring means to return said levers to their normal positions when the guide wheels have been straightened out.

4. In a direction indicating device for motor vehicles, a casing adapted to be mounted upon a steering post, a first lever having one end thereof loosely connected to a second lever, spring means normally holding the connected ends of said levers against the wall of the casing, a third lever having a fourth lever pivotally connected thereto, spring means normally holding the connected ends of said third and fourth levers against the wall of the casing, a handle projecting out of the casing and adapted to be moved into the casing to force the connected ends of said levers from the wall of the casing, spring controlled means for holding said second lever in a latched position when the handle is moved into the casing, contact means on said first lever for closing an electrical circuit, a pin, a guide for the pin, said fourth lever having a forked end engaging the pin to hold the latter in a predetermined position, spring means on said fourth lever to resist movement of the pin from said predetermined position, and a steering wheel having a projection on the underside thereof adapted to engage said pin to move the latter in the guide from said predetermined position when the wheel is turned in one direction, said projection engaging the pin to move the latter to release said latching means when the wheel is turned in an opposite direction.

5. In a direction indicating device for motor vehicles, a casing adapted to be mounted on a steering post, a first pair of levers, one of said levers having contact means for closing an electrical circuit, a handle projecting from the casing to move said levers to make said contact to indicate that the vehicle is to be turned from a straight line, means to latch said levers to maintain said contact during the turning of the vehicle, a pin, a guide for said pin, a lever having a forked end engaging said pin, said handle moving said last mentioned lever to move the pin to a predetermined position during the turning of the vehicle, a steering wheel having a projection on the underside thereof adapted to engage the pin to move the latter in the guide from said predetermined position during the turning of the vehicle, spring means to constantly urge said pin to said predetermined position, said projection moving said pin to release said latching means when the guide wheels of the vehicle have been straightened out, and spring means to normally hold said levers in a predetermined position.

6. In a direction indicating device for motor vehicles, a casing adapted to be mounted on a steering post, a first lever in the casing, a handle projecting from the casing and adapted to move said lever to close an electrical circuit through direction indicating lamps, latching means for holding said lever in a circuit closing position, a pin, a guide for said pin, a second lever having one end thereof loosely engaging said pin, said handle engaging said second lever to cause the latter to move the pin to a predetermined position, a steering wheel having a projection on the underside thereof adapted to engage said pin to move the latter in the guide from said predetermined position when the wheel is turned in one direction, spring means carried by said second lever to resist movement of the pin from the predetermined position, said projection engaging the pin to cause the pin to release the latching means when the wheel is turned in an opposite direction, and spring means to return said levers to their initial positions when the latching means are released.

CARL F. BIERBACH.